United States Patent
Lee et al.

(10) Patent No.: US 6,809,125 B1
(45) Date of Patent: Oct. 26, 2004

(54) FOAM COMPRISING POLYOLEFIN BLEND AND METHOD FOR PRODUCING SAME

(75) Inventors: Shau-Tarng Lee, Oakland, NJ (US); Natarajan S. Ramesh, Grapevine, TX (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 47 days.

(21) Appl. No.: 09/586,493

(22) Filed: Jun. 2, 2000

(51) Int. Cl.[7] .............................................. C08L 23/08
(52) U.S. Cl. ...................................... 521/134; 525/240
(58) Field of Search ........................... 521/134, 79, 81; 525/240

(56) References Cited

U.S. PATENT DOCUMENTS

| | | | |
|---|---|---|---|
| 4,567,219 A | 1/1986 | Tominaga et al. | 524/413 |
| 4,649,001 A | 3/1987 | Nakamura et al. | 264/50 |
| 4,738,810 A | 4/1988 | Cheng-Shiang | 264/54 |
| 4,785,045 A | 11/1988 | Yonekura et al. | 524/528 |
| 4,900,490 A | 2/1990 | Kozma | 264/54 |
| 4,929,303 A | 5/1990 | Sheth | 156/209 |
| 5,000,992 A | 3/1991 | Kelch | 428/36.5 |
| 5,032,463 A | 7/1991 | Smith | 428/520 |
| 5,053,438 A | 10/1991 | Kozma | 521/134 |
| 5,167,765 A | 12/1992 | Nielsen et al. | 162/146 |
| 5,290,822 A | 3/1994 | Rogers et al. | 521/94 |
| 5,292,815 A | 3/1994 | Wreesmann et al. | 525/259 |
| 5,320,887 A | 6/1994 | Moss et al. | 428/35.7 |
| 5,346,926 A * | 9/1994 | Sakamoto et al. | 521/81 |
| 5,393,796 A | 2/1995 | Halberstadt et al. | 521/134 |
| 5,428,093 A | 6/1995 | Lee | 524/317 |
| 5,462,974 A | 10/1995 | Lee | 521/79 |
| 5,502,158 A | 3/1996 | Sinclair et al. | 528/354 |
| 5,667,728 A | 9/1997 | Lee | 252/350 |
| 5,783,611 A | 7/1998 | Strebel | 521/51 |
| 5,844,009 A * | 12/1998 | Hurley et al. | 521/112 |
| 5,929,129 A * | 7/1999 | Feichtinger | 521/134 |
| 6,096,793 A * | 8/2000 | Lee et al. | 521/134 |

OTHER PUBLICATIONS

Sclair Polyethylene, Product Data Sheet Injection Molding Resin, 2514 MDPE, Nova Chemicals, Injection Molding,, Apr. 25, 2000.

Sclair Polyethylene, Product Data Sheet Injection Molding Resin, 2714 HDPE, Nova Chemicals, Injection Molding, Apr. 25, 2000.

Sclair Polyethylene, Product Data Sheet Injection Molding Resin, 2815 HDPE, Nova Chemicals, Injection M lding, Apr. 25, 2000.

Pending application USSN 09/219,104 (Lee), filed Dec. 22, 1998 and owned by the same assignee as the present application. USPN 6096793.

* cited by examiner

*Primary Examiner*—James J. Seidleck
*Assistant Examiner*—Melanie Bissett
(74) *Attorney, Agent, or Firm*—Thomas C. Lagaly

(57) ABSTRACT

A foam and method for making such foam includes a blend of a low density polyethylene and a higher density ethylene polymer. The ethylene polymer has a density ranging from greater than 0.94 to about 0.97 grams/cubic centimeter and a melt flow index of greater than 10 g/10 minutes, and may include at least one member selected from ethylene/alpha-olefin copolymer, ethylene homopolymer, and blends thereof.

2 Claims, No Drawings

FOAM COMPRISING POLYOLEFIN BLEND AND METHOD FOR PRODUCING SAME

BACKGROUND OF THE INVENTION

The present invention relates generally to polyolefin foams and, more particularly, to extruded foam sheets comprising a blend of low density polyethylene and a higher density, high melt index ethylene polymer.

Polyolefin foams, particularly those made from polyethylene, and methods of manufacturing polyolefin foam sheets are well known in the art. See, e.g., U.S. Pat. Nos. 5,462,974 (Lee), and 5,667,728 (Lee), the disclosures of which are incorporated herein by reference thereto. One of the most common polyolefins used to produce foam is polyethylene and, specifically, low density polyethylene (LDPE). While LDPE possesses a number of beneficial physical and chemical properties when used to produce a foamed sheet, a disadvantage of LDPE is that extruded foam sheets made therefrom have mechanical properties, such as tear resistance, tensile strength and creep resistance, that are lower than would otherwise be desired for certain applications.

U.S. Pat. No. 4,738,810 (Cheng-Shiang) teaches that the mechanical properties of an LDPE foam sheet can be improved by blending linear low density polyethylene (LLDPE) with the LDPE when the LLDPE has a melt index (MI) below 10 g/10 minutes, and preferably between 1 and 7 g/10 min.

The inventors hereof have found, however, that when an LLDPE, a higher density ethylene/alpha-olefin copolymer, or a higher density ethylene homopolymer with a MI of less than 10 g/10 min. is blended with LDPE, the shear forces exhibited by the blend increase sharply during extrusion, relative to extruding LDPE alone, resulting in the generation of excess heat. This heat generation was found to degrade the appearance of the resultant foam and lead to inferior mechanical properties due to a high percentage of open cells and non-uniform cell-size and cell-wall thickness. Also, the excess heat reduces the foaming efficiency, i.e., the foam has less void volume and therefore higher density for a given amount of blowing agent.

The foregoing problems are believed to occur because the heat build-up reduces the melt strength of the polymer melt and increases the volatility of the blowing agent, resulting in less void volume and more open cells as the blowing agent escapes from the polymer melt before it can cool sufficiently to form an adequate number of closed cells within which the blowing agent would otherwise be trapped. The increased heat is also believed to reduce the beneficial tendency of the LDPE to exhibit strain hardening during extrusion through a foaming die and during expansion outside of the die. As is known, strain hardening during extrusion and expansion promotes uniform cell-size distribution. One of the reasons that LDPE is commonly used in the production of foams is its strain-hardening capability and resultant promotion of cell uniformity. However, this capability decreases with increasing temperature, as caused, e.g., by the high shear forces exhibited by low MI ethylene/alpha-olefin copolymer (less than 10 g/10 min.) during extrusion foaming.

Accordingly, a need exists in the art for a polyolefin blend capable of producing an extruded foam sheet with improved mechanical properties but without the drawbacks of using low MI (less than 10 g/10 min.) ethylene/alpha-olefin copolymer or ethylene homopolymer.

SUMMARY OF THE INVENTION

That need is met by the present invention, which provides a foam, comprising a blend of a low density polyethylene and an ethylene polymer having a density ranging from greater than 0.94 to about 0.97 grams/cubic centimeter and a melt flow index of greater than 10 g/10 minutes, the ethylene polymer comprising at least one member selected from ethylene/alpha-olefin copolymer, ethylene homopolymer, and blends thereof In another aspect of the present invention, a method is provided for making a foam, comprising:

a. blending a low density polyethylene and an ethylene polymer having a density ranging from greater than 0.94 to about 0.97 grams/cubic centimeter and a melt flow index of greater than 10 g/10 minutes, the ethylene polymer comprising at least one member selected from ethylene/alpha-olefin copolymer, ethylene homopolymer, and blends thereof;

b. adding a blowing agent to the blend; and c. causing the blowing agent to expand within the blend, thereby forming a foam.

DETAILED DESCRIPTION OF THE INVENTION

The inventors hereof have determined that an ethylene/alpha-olefin copolymer having a melt index greater than 10 g/10 min. generates far less shear friction when blended with LDPE than other ethylene/alpha-olefin copolymers having a MI of less than 10 g/10 min. As a result, less heat is generated during extrusion so that the resultant foams have better appearance and cell formation, i.e., less open cells and more uniformity in cell-size and cell wall-thickness, than foams made with a low MI ethylene/alpha-olefin copolymer (less than 10 g/10 min.), so that foams in accordance with the present invention also have better mechanical properties and foaming efficiency.

Copending and commonly owned U.S. Ser. No. 09/219,104 (Lee), filed Dec. 22, 1998, describes the foregoing benefits in relation to blends of LDPE and ethylene/alpha-olefin copolymer having a density ranging from about 0.86 to about 0.94 grams/cubic centimeter and a melt flow index of greater than 10 g/10 minutes. The inventors have now discovered that these same benefits are also realized when LDPE is blended with higher density ethylene polymers, i.e., ranging from greater than 0.94 to about 0.97 grams/cubic centimeter, when such ethylene polymers have a melt flow index of greater than 10 g/10 minutes. (The blend of LDPE with a higher density ethylene polymer is sometimes referred to herein as "the polyolefin blend.") Higher density ethylene polymers in accordance with the invention include ethylene/alpha-olefin copolymer, ethylene homopolymer, and blends of ethylene/alpha-olefin copolymer and ethylene homopolymer.

Any LDPE may be used in a blend with higher density ethylene polymer. Preferably, the LDPE has a crystallinity ranging from about 10% if to about 55% and a softening point (DSC melt peak) ranging from about 95° C. to about 130° C. More preferably, the crystallinity of the LDPE ranges from about 20% to about 40% and the softening point ranges from about 105° C. to 115° C. The melt index of the LDPE may range from 0.1 to over 50 g/10 min. but preferably ranges from about 1 to about 10 g/10 min.

The ethylene polymer preferably has a melt index (MI) greater than about 12 g/10 min. More preferably, the MI is greater than about 15 g/10 min. The MI is determined in accordance with ASTM D-1238.

When the ethylene polymer blended with LDPE is an ethylene/alpha-olefin copolymer, the density thereof preferably ranges from greater than 0.94 to about 0.96 grams/cubic centimeter. The alpha-olefin is preferably selected from the group consisting of $C_3$ to $C_{20}$ alpha-olefins, such as propene, 1-butene, 1-pentene, 1-hexene, 1-octene, methyl pentene and the like. Most preferably, the alpha-olefin is 1-butene, 1-hexene or 1-octene. Examples of such higher density ethylene/alpha-olefin copolymers include SCLAIR ethylene/butene copolymers, such as SCLAIR 2514 having a density of 0.941 g/cc and MI of 45 g/10 min. (6.3 butene units/1000 carbon atoms); SCLAIR 2714 having a density of 0.951 g/cc and MI of 51 g/10 min.; SCLAIR 2815 having a density of 0.952 g/cc and MI of 69 g/10 min.; and SCLAIR 2710 polyethylene containing 1 butene mer unit per 1000 carbon atoms (0.4% by weight butene), 0.950 g/cc density and 17 g/10 min. MI. SCLAIR 2710 is believed to be a blend of ethylene/butene copolymer and ethylene homopolymer. The foregoing SCLAIR ethylene polymers are commercially available from Nova Chemicals Inc., Moon Township, PA. Another suitable ethylene/alpha-olefin copolymer is HMA047, an ethylene/hexene copolymer from ExxonMobile having a density of 0.951 $g/cm^3$ and a melt index of 23 g/10 min.

Ethylene homopolymer having a density ranging from greater than 0.94 to about 0.97 grams/cubic centimeter and a melt flow index of greater than 10 g/10 minutes, e.g., high density polyethylene (HDPE), and blends thereof with ethylene/alpha-olefin copolymer, may also be used in a blend with LDPE in accordance with the present invention.

Preferably, the low density polyethylene is present in the blend at a weight percentage ranging from about 30 to 95 and the higher density ethylene polymer is present in said blend at a weight percentage ranging from about 5 to about 70, the weight percentages based on the total amount of low density polyethylene and ethylene polymer in the blend. More preferably, the LDPE is present in the blend at a weight percentage ranging from about 50 to about 90 while the ethylene polymer is present at a weight percentage ranging from about 10 to about 50. Most preferably, the weight percentage of the LDPE ranges from about 60 to about 90 while the that of the ethylene polymer ranges from about 10 to about 40, such as between 15 to 35, 20 to 30, etc.

The foam is preferably an extruded foam sheet. As such, the sheet may have any desired thickness, e.g., a maximum thickness of about 100 millimeters. When the foam has a thickness ranging from about 1–20 mm, it is considered a foam "sheet," and when it has a thickness ranging from about 10–100 mm, it is considered a foam plank.

The foam may have any desired density, ranging, e.g., from about 10 to about 160 $kg/m^3$. The density preferably ranges from about 12–100 $kg/m^3$ and, most preferably, from about 15 to 50 $kg/m^3$.

In accordance with another aspect of the present invention, there is provided a method for making the foam as described above. The method generally comprises the steps of
 a. blending a low density polyethylene and an ethylene polymer having a density ranging from greater than 0.94 to about 0.97 grams/cubic centimeter and a melt flow index of greater than 10 g/10 minutes (the ethylene polymer comprising at least one member selected from ethylene/alpha-olefin copolymer, ethylene homopolymer, and blends thereof as noted above);
 b. adding a blowing agent to the blend; and
 c. causing the blowing agent to expand within the blend, thereby forming a foam.

Any conventional chemical or physical blowing agents may be used.

Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polyolefin blend in any desired amount to achieve a desired degree of expansion in the resultant foam. Generally, the blowing agent may be added to the polyolefin blend in an amount ranging from about 0.5 to 80 parts by weight, based on 100 parts by weight of the polyolefin blend (i.e., between 0.5 and 80 weight percent (wt. %) blowing agent). More preferably, the blowing agent is present at an amount ranging from 1 to 30 and, most preferably, from 3 to 15 parts per 100 parts by weight of the polyolefin blend.

If desired or necessary, various additives may also be included with the polyolefin blend. For example, it may be desirable to include a nucleating agent (e.g., zinc oxide, zirconium ode, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process as is well known in the art. In such a process, the LDPE and higher density ethylene polymer are added to an extruder, preferably in the form of resin pellets. Any conventional type of extruder may be used, e.g., single screw, double screw, and/or tandem extruders. In the extruder, the resin pellets are melted and mixed. The blowing agent is preferably added to the melted polyolefin blend via one or more injection ports in the extruder. Any additives that are used may be added to the melted polyolefin blend in the extruder and/or may be added with the resin pellets. The extruder pushes the entire melt mixture (melted polyolefin blend, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to expand into cells that solidify upon cooling of the polymer mass (due to the reduction in temperature), thereby trapping the blowing agent within the cells.

Other foam making processes that may also be employed include injection molding, bead molding, rotational molding . . . etc.

These and other aspects and advantages of the invention may be further understood by reference to the following examples, which are provided for illustrative purposes only and are not intended in any way to be limiting.

EXAMPLES

Example 1

Polyolefin foam sheets were made by blending, in a tandem extruder, Novacor 219a LDPE resin having a density of 919 kilograms/cubic meter (0.919 g/cc) and a melt index of 2 g/10 min., talc, a mixture containing glycerol monostearate and ethanolamide, and propane as a blowing agent. The mixture was extruded out of an annular die, whereupon it expanded into a foam tube and the tube was slit to form a sheet. Three such foams were made, one with LDPE as the only polyolefin in the mixture (a control sample) and the other two foams including LDPE blended with SCLAIR 2514 ethylene/butene copolymer having 6.3 butene groups per 1000 carbon atoms (2.5% by weight butene), a density of 0.941 g/cc, and a melt index of 45 g/10 min. The SCLAIR ethylene/butene copolymer was mixed with the LDPE at 25% and 50% by weight, based on the total amount of polyolefin in the foams.

The resultant foam sheets had a thickness of about 120 mils (1 mil=0.001 inch) and a density of 1.07 pcf (17.1 kg/m3). Each sheet was tested under ASTM D 2221 for % creep to measure its ability to recover the original thickness of the foam after being weighted by a 1.5 psi load for 9 days. The test results are summarized in Table 1.

TABLE 1

| Foam Sample | Polyolefin Composition | % Creep (Loss in original thickness at 1.5 psi loading) |
|---|---|---|
| 1. LDPE (Control) | 100% LDPE | 81% |
| 2. LDPE/SCLAIR 2514 Blend | 75% LDPE + 25% SCLAIR 2514 | 61.6% |
| 3. LDPE/SCLAIR 2514 Blend | 50% LDPE + 50% SCLAIR 2514 | 56.3% |

As shown by the data in Table 1, the LDPE/alpha-olefin copolymer blend exhibits an improvement in creep resistance in comparison to foam made with LDPE alone. Increasing the amount of SCLAIR 2514 to 50% shows further improvement.

The above foams were further tested for tear resistance in accordance with ASTM D3575-93, Suffix G in both the machine direction (MD) and cross-machine direction (CMD-transverse to the MD). The results are set forth in Table 2.

TABLE 2

| Polyolefin Composition | Tear Resistance, lb$_F$/inch (MD) | Tear Resistance, lb$_F$/inch (CMD) |
|---|---|---|
| 100% LDPE (Control) | 3.30 | 5.30 |
| 75% LDPE/25% SCLAIR 2514 Blend | 5.20 | 6.73 |
| 50% LDPE/50% SCLAIR 2514 Blend | 6.33 | 8.18 |

As shown, tear resistance of the foams improved significantly by blending SCLAIR 2514 ethylene/butene copolymer with LDPE.

Example 2

Polyolefin foam sheets were made by blending, in a twin-screw, counter-rotating, extruder, Novacor 219a LDPE resin (0.919 g/cc density and 2 g/10 min. MI), talc, glycerol monostearate, and isobutane blowing agent. The mixture was extruded out of an annular die, whereupon it expanded into a foam tube and the tube was slit to form a sheet. Four such foams were made, one with LDPE as the only polyolefin in the mixture (a control sample) and the other three foams including LDPE blended with SCLAIR 2710 polyethylene containing 1 butene mer unit per 1000 carbon atoms (0.4% by weight butene; 950 kg/cubic meter density; 17 g/10 min. MI). The ethylene/butene copolymer was blended with LDPE at 10%, 20%, and 33% levels, such percentages being weight percents based on the total weight of the polyolefin in the foams. The resultant foams were tested for tear resistance, % elongation, and tensile strength. The results are summarized in Table 3.

TABLE 3

| Polyolefin Composition | Density (pcf)/ Thickness (inch) | Tear Resistance* (lb$_F$/inch) MD | Tear Resistance* (lb$_F$/inch) CMD | % Elongation** MD | % Elongation** CMD | Tensile strength** (psi) MD | Tensile strength** (psi) CMD |
|---|---|---|---|---|---|---|---|
| 100% LDPE (Control) | 1.85/ 0.10 | 9.2 | 10.3 | 85.3 | 64.7 | 338.2 | 63 |
| 90% LDPE + 10% SCLAIR 2710 | 1.66/ 0.12 | 8.3 | 11.4 | 66.2 | 62.1 | 323.2 | 182 |
| 80% LDPE + 20% SCLAIR 2710 | 2.15/ 0.07 | 10.8 | 18.3 | 66.3 | 36 | 648.2 | 402.2 |
| 67% LDPE + 33% SCLAIR 2710 | 2.17/ 0.08 | 10.9 | 18.9 | 56.4 | 37.3 | 619.1 | 407.1 |

*in accordance to ASTM D3575-93 Suffix G MD/CMD
**both in accordance to ASTM D3575-93 Suffix T MD/CMD As indicated by the above results, foams made with a blend of LDPE and ethylene/butene copolymer are generally stronger and tougher than foams made with LDPE alone, as exhibited by improved tensile strength and tear resistance, particularly as the percentage of the ethylene/butene copolymer was increased to 20. This is also indicated by the decrease in elongation in the blended foam vs. LDPE alone.

Example 3

Foam sheets having a nominal thickness of 90 mils were made as in Example 2, except that SCLAIR 2514 ethylene/butene copolymer (6.3 butene mer units/1000 carbon atoms; 0.941 g/cc density; 45 g/10 min. melt index) was blended with LDPE at weight percents of 10, 20, 30, and 45 (based on the total amount of polyolefin in the foam). The foams were tested for tensile strength, % elongation and tear resistance in accordance with the ASTM procedures noted above. The results are summarized in Table 4 below.

TABLE 4

| Wt. % E/B Co-polymer | Density (pcf) | Tensile Strength MD (psi) | Tensile Strength CMD (psi) | Elongation MD % | Elongation CMD % | Tear Resist. MD (lb$_F$/in) | Tear Resist. CMD (lb$_F$/in) |
|---|---|---|---|---|---|---|---|
| 0 (control) | 1.8 | 75 | 24 | 204 | 145 | 5.5 | 9.2 |
| 10 | 2 | 78 | 38 | 231 | 204 | 7.95 | 13.6 |
| 20 | 2.15 | 87 | 42 | 234 | 182 | 10.4 | 13.9 |
| 30 | 1.8 | 77 | 34 | 65 | 105 | 7.5 | 13.6 |
| 45 | 2 | 49 | 31 | 106 | 124 | 8.4 | 9.1 |

As shown, the mechanical properties of the foam generally increased by blending ethylene/butene copolymer with the LDPE, and reached optimum values at about 10 to 30 wt. % copolymer. It may be noted that at 10 and 20 % copolymer, the elongation of the foam in both the MD and CMD increased relative to LDPE alone, whereas in Example #2, the % elongation of the blended foam was less than LDPE alone. This difference is believed due to the different ethylene/butene copolymers used in those two examples. In Example 2, the copolymer had a higher density (950 Kg/M$^3$ vs. 941 Kg/M$^3$) and a lower MI (17 g/10 min. vs. 45 g/10 min.) than the copolymer used in Example 3. The copolymer of Example 2 was thus more stiff and therefore resulted in a stiffer foam with lower % elongation relative to the copolymer in Example 3, which resulted in a softer foam with higher elasticity. Thus by altering the density and melt index of the copolymer used in the blend, the stiffness and elongation of the resultant foam may be controlled to best suit the packaging application for which the foam is intended to be used.

Example 4

Foam sheets were made on a 68mm twin screw, counter-rotating extruder using LDPE and blends thereof with HMA047, an ethylene/hexene copolymer from Mobile having a density of 0.951 g/cm$^3$ and a melt index of 23 g/10 min. Isobutane was used as a blowing agent. The processing conditions and product properties are summarized in Tables 5 and 6 below.

Processing Conditions:

TABLE 5

| Resin Type | Die Pressure | Melt Temperature |
|---|---|---|
| 100% LDPE | — | 220 |
| 10% HMA047/ 90% LDPE | 626 | 227 |
| 20% HMA047/ 80% LDPE | 520 | 230 |

Product Properties:

TABLE 6

| Resin | Thickness Inch | Density lb/ft$^3$ | Tear, lb/in CMD | Tear, lb/in MD | Tensile, psi CMD | Tensile, psi MD | Elongation, % CMD | Elongation, % MD |
|---|---|---|---|---|---|---|---|---|
| 10% 047 | 0.071 | 2.6 | 18.2 | 12.5 | 58 | 97 | 105 | 139 |
| 20% 047 | 0.074 | 2.4 | 14.0 | 10.9 | 49 | 77 | 69 | 101 |

What is claimed is:

1. A foam, comprising a blend of a low density polyethylene and an ethylene polymer having a density ranging from greater than 0.95 to about 0.97 grams/cubic centimeter and a melt flow index ranging from 23 to 69 g/10 minutes, said ethylene polymer comprising at least one member selected from ethylene/alpha-olefin copolymer, ethylene homopolymer, and blends thereof.

2. The foam of claim 1, wherein the blend further includes an aging modifier selected from at least one fatty acid ester, fatty acid amide, or hydroxyl amide.

* * * * *